Figure 1:
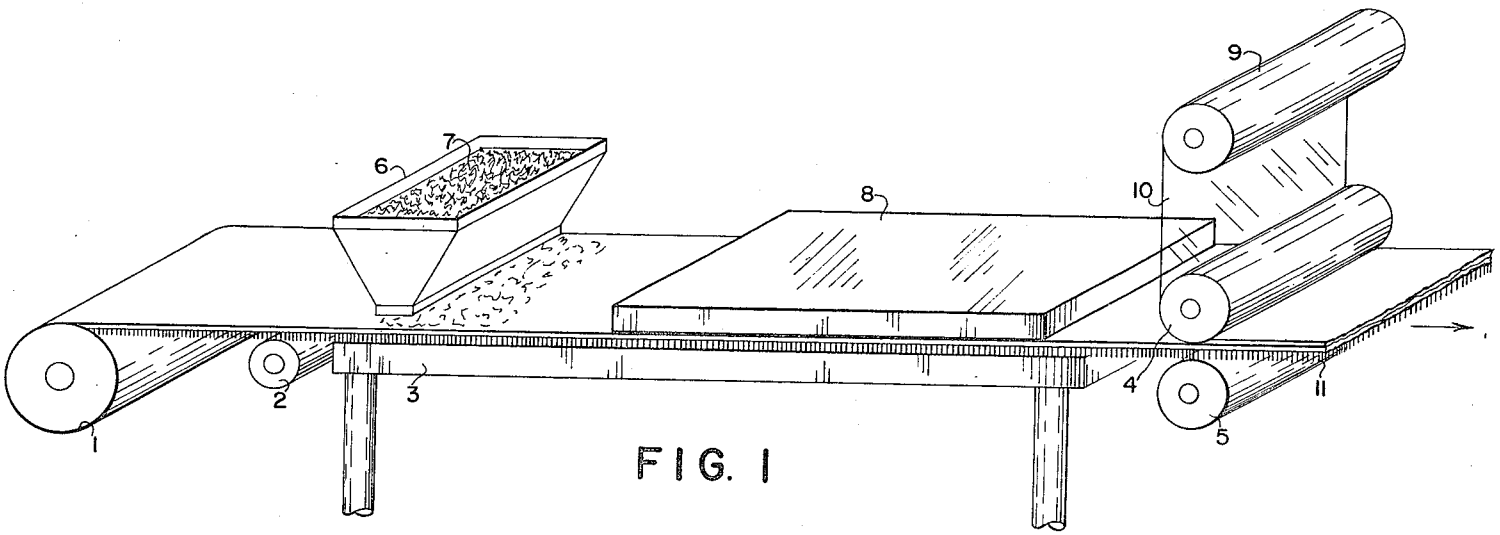
Figure 2:
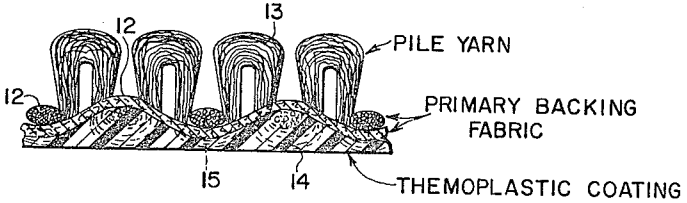

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 27, 1970

870 O.G. 1063

T870,019
MANUFACTURE OF PILE FABRICS

James K. Harkleroad and Donald C. Davis, both of P.O. Box 511, Kingsport, Tenn. 37662

Filed Mar. 26, 1968, Ser. No. 716,216
Int. Cl. D05c *15/00*
U.S. Cl. 156—72
1 Sheet Drawing. 13 Pages Specification

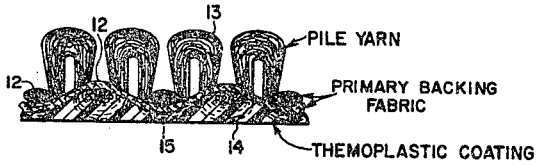

A process for the manufacture of a textile material, such as a pile fabric having a primary backing fabric having other fibers tufted thereinto or otherwise associated therewith and having high resistance to mechanical removal of such fibers therefrom, by depositing on the backing fabric a thermoplastic material such as powdered polyethylene, melting the deposited material so that it adhesively joins and penetrates into but not completely through the backing fabric and, while the material is still in a molten condition, superimposing on the treated fabric a thin sheet or film of a thermoplastic material or other material and thereafter passing the composite material through a pair of pinch rolls heated to such a temperature as to cause the underlying molten thermoplastic to surround the individual fibers on the back of the textile material, whereby such fibers are locked to the backing fabric by the adhesive effect of the plastic material.

Jan. 27, 1970 J. K. HARKLEROAD ET AL T870,019

MANUFACTURE OF PILE FABRICS

Filed March 26, 1968

JAMES K. HARKLEROAD
DONALD C. DAVIS
INVENTORS

BY William T. French
George P. Chandler
ATTORNEYS